F. ECAUBERT.
COMPENSATING BALANCE FOR TIMEPIECES.
APPLICATION FILED OCT. 22, 1908.
965,506. Patented July 26, 1910.
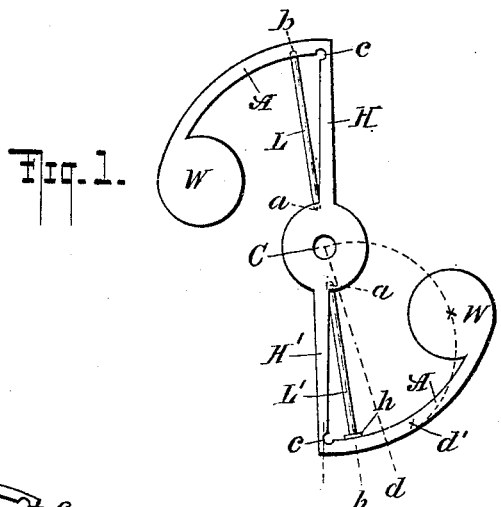
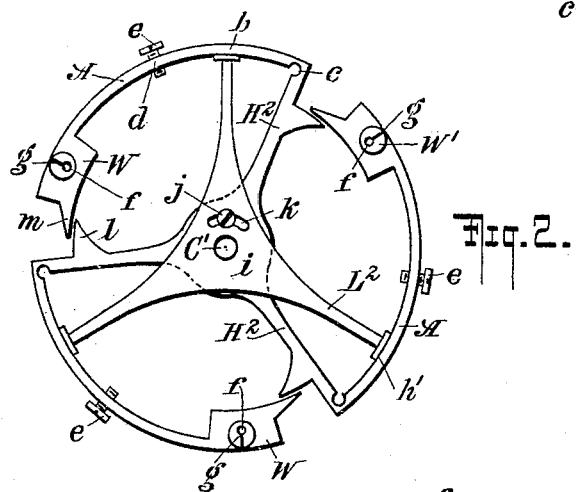
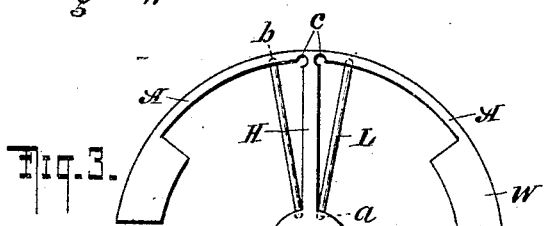
WITNESSES
G. V. Rasmussen
John Lotka
INVENTOR
FREDERIC ECAUBERT
BY
ATTORNEYS

UNITED STATES PATENT OFFICE.

FREDERIC ECAUBERT, OF NEW YORK, N. Y.

COMPENSATING BALANCE FOR TIMEPIECES.

965,506.  Specification of Letters Patent.  Patented July 26, 1910.

Application filed October 22, 1908. Serial No. 458,947.

*To all whom it may concern:*

Be it known that I, FREDERIC ECAUBERT, a citizen of the United States, and a resident of the borough of Brooklyn, county of Kings, city and State of New York, have invented certain new and useful Improvements in Compensating Balances for Timepieces, of which the following is a description.

My invention relates particularly to the balance wheels used in watches, chronometers, and other time pieces of such class, and has for its object to provide means whereby the rate of movement of such balance wheel, and hence the uniform running of the time piece, is unaltered by any change in its temperature.

A further object of my invention is, as will be more clearly set forth hereinafter, to provide a balance wheel of the class referred to which can be manufactured without brazing or welding, and can be duplicated or replaced either in whole or in part with the certainty of obtaining similar results, and which can be adjusted for speed variations or for balance in less time than the ordinary compensating balance wheels now in use; and which by reason of the construction in employing a member of low expansion makes it possible to replace said member with ease and to calculate on a mechanical basis the length of leverage in advance of the manufacture of the wheel.

A still further object of my invention is to provide a "non-magnetic" balance wheel whose period of vibration shall not be altered by reason of surrounding or neighboring magnetic conditions or changes.

More especially my invention comprises certain novel means whereby certain determined parts of the wheel are automatically caused to shift their mass inwardly or outwardly to an extent sufficient to counteract the opposite shift due directly to the temperature change and thus to maintain the oscillation period of the wheel unchanged.

As generally used at the present day and for many years past, the majority of balance wheels in the better class of watches and in chronometers, consists essentially of an oscillating wheel the rim of which consists of two segments each comprising a thin flat brass strip soldered or otherwise firmly attached throughout its length, to the periphery of each segment body. Each of these segments is secured at one end to the spoke of the wheel, the other end of the segment being free. As the wheel expands or contracts with rise or fall of temperature, each strip takes on a greater or less curvature throughout its length, thus transferring its mass toward or from the center as the case may be and thereby tending to compensate for the oppositely shifted mass of the wheel taken as a whole. To increase or decrease the oscillation period of the wheel for a definite temperature as *e. g.*, the normal temperature at which the time piece is standardized, a number of small screws are peripherally spaced and tapped into the strips; these screws also vary the amount of compensation due to a given change of temperature by an amount depending upon their angular distance from the supported end of the strip.

The chief disadvantages of the above described wheel are (1), the difficulty of thoroughly uniting the two strips in every portion of their length; (2) the impossibility of determining in advance just how much change of curvature will be produced by a given change of temperature, and (3), as a consequence, the large amount of time required to secure the best adjustment in a given time piece.

The above difficulties are eliminated with my improved form of wheel and the whole matter of temperature adjustment of a time piece reduced to a mathematical basis.

I am aware that prior to my invention attempts have been made to simplify the construction of the balance wheel by trying to make use of the leverage system, as for instance in patent to Hawkes and Reed, No. 12129 and British Patent No. 5639 of 1828 to Ulrich. The structures shown and described in these two patents, however, are wholly inoperative for the purpose for which they were intended and have therefore, instead of enriching the art, retarded it. Thus for instance in the case of the Hawkes and Reed patent no one experienced in the art, making the very best use of the information given in said patent, can produce a balance wheel which will compensate for inaccuracies in running caused by thermal variations; in fact the best selection of their materials and the greatest amount of leverage obtainable in said construction under the best conditions will fail wholly to produce a balance wheel which really compensates for temperature variations. The Hawkes and Reed construction, employing as it does steel and brass whose co-efficients of expansion are as 2 to 3, made it impossible to create pivotal points in proper relation with reference to the true fulcrum and to the position of the weight and also the expansion or contraction of the outer rim could not possibly be compensated by the mechanism employed. In Ulrich the body of the wheel is of platinum which is three times heavier than steel and about one-half as resistant and therefore wholly unsuitable; furthermore, the construction of the brass parts necessarily alters with every variation of temperature, and does not remain stable. It has no definite pivots nor fulcrum nor definite lengths of levers, and its own great weight makes it impossible to use the proper amount of compensating weight at the free end of the lever, within the limits of ½ gram.

By my invention I have not only overcome the difficulties of the ordinary balance wheel, but I have created an entirely new balance wheel, based on the leverage system, which in fact, compensates for variations in temperature and accomplishes the advantages so long sought for.

Referring to the drawings Figure 1 is a plan view of one of the simplest embodiments of my wheel when constructed with two compensating weights. Fig. 2 is a plan view of a modified form having three compensating weights, and Fig. 3 is a plan view of a form having four compensating weights.

Like letters of reference apply to like parts throughout the drawings.

Turning to Fig. 1, H is a spoke of brass or other non-magnetic metal having a relatively large co-efficient of expansion; it is preferably flat and has a central bearing C at right angles to its plane. H is the active member of the compensator. Joined to the two ends of the spoke are curved lever arms, A, symmetrically disposed as to the center; a weight W is carried at the outer end of each arm. L is a rod or tube of quartz, glass or other silicious material having a coefficient of expansion much lower than that of brass; anyone of a number of different glasses, each having a different coefficient, may be used but I find ordinary glass, with a coefficient about one half that of brass, quite satisfactory. This rod is set with one end in an appropriate recess, $a$, in the hub of the spoke and its outer end in a similar recess, $b$, in the lever arm.

As shown in Fig. 1 the lever arm A is really integral with the spoke H being weakened at $c$ where it joins the spoke so as to serve as a pivot or hinge. In assembling the wheel this arm is given a pronounced inward flex before the rod L is inserted; L is therefore under permanent compression due to the resiliency of the hinge $c$. Suppose, now, the wheel to become heated, each spoke will lengthen from the center outwardly; each compression member, L, will also lengthen but only about half as much, i. e., in the ratio of the two coefficients which, I have stated, are as 1:2. The lever arm A is therefore actuated by H, upon $b$, as a fulcrum, to carry the weight W in toward the center.

I have referred to $b$ as the fulcrum and it is when considered in the usual mechanical sense. It must not, however, be taken as the fixed point, about which the lever arm A actually pivots to carry the weight W in or out. There is such a fixed point which remains at a constant distance from the axis C, but it lies between $b$ and the weight W and will only coincide with $b$ when the member L retains the same length for every temperature, i. e., has a zero coefficient of expansion. With the expansion coefficients of H and L as 1 to 2, it is clear that if $c$ moves outward two units for a given temperature change, $b$ will move out one unit and that there will be a point on the lever, as at $d$, which will remain at a constant distance from C; this point may be spoken of as the "true fulcrum" or "neutral point." In this particular case the distance between $d$ and $b$ will be equal to the distance between $b$ and $c$ and in general it may be shown that for any two expansion coefficients of L and H, provided only that of L be less than that of H, the distance between the true fulcrum and the mechanical or conventional fulcrum will be $$\frac{L^t}{H^t - L^t} \times S,$$

where $H^t$ and $L^t$ are the temperature coefficients of H and L respectively, and where S is the length of the short end of the lever, i. e. the distance between $b$ and $c$. The recognition of this "true fulcrum" as distinguished from the mechanical fulcrum is of vital importance in a compensating balance wheel of the type shown in the drawings. It is seen that instead of having to compensate only for the outward or inward shifting of a small percentage of the mass of the spokes and for the shorter or inner lever arm, we may also have to compensate for a considerable percentage of the outer or longer lever arm. Thus if H and L were brass and steel respectively (having expansion coefficients about as 3 to 2) the true fulcrum would be at $d'$ instead of $d$, a length from $b$ double that from $b$ to $c$; in such a case it would be absolutely impossible to secure sufficient compensation to offset the change due to expansion of the spokes and lever length $d'$ $c$ except by making W so great as to be impracticable in so small and delicate a structure as a balance wheel the weight of which cannot in practice much exceed one-half gram.

In order to operate the compensator properly it is advisable that the weight should move as near as may be in a radial direction toward or from the center C, this follows from the fact that if the weight W moves in any direction other than the radial direction, only the radial component of such movement will be effective for compensation purposes and it may even occur that if the weight is placed at a great distance from the true fulcrum $d$ the weight will be carried away from the center C at a time when in order to effect proper compensation it should be moving toward the center. It therefore follows that the difficulty of a prohibitively heavy weight, mentioned in the last paragraph, could not be overcome by simply lengthening the lever so as to increase the distance between $d$ and the center of gravity of the weight W. In order to have the weight W move as nearly as possible in a radial direction, it should preferably be located upon a semi-circle whose diameter coincides with the radius C, $d$ and the best location of the weight would be approximately at the center of said semi-circular arc. Considering the fact, however, that if the distance between the points $c$ and $b$ is extremely small, any inaccuracy in the placing of the mechanical fulcrum $b$ will greatly affect the movement of the weight W, it is advisable that the arc $c$, $b$, should not be too small. In the above connection it must be remembered that the hair-spring, also, lengthens and weakens with increase of temperature, both effects tending to slow the balance wheel, and that the converse is true for a decrease of temperature. This imposes an additional burden of compensation upon the balance wheel device since this variation due to the hair-spring must also be taken care of if the time piece is to run accurately.

But by the use of materials for L and H having sufficiently dissimilar expansion coefficients, I am enabled to satisfy all the foregoing requirements viz., secure sufficient compensation with approximately radial movement of the weight, without unduly increasing the magnitude of the weight, and without too great decrease of the arc between $c$, and $b$.

Recognition of the "true fulcrum" and ability to locate it definitely makes the adjustment of a balance wheel in a given time piece a matter of exact mathematics and calculation as distinguished from the "cut and try" methods which must be used in the conventional and old "compound strip" wheel previously described.

By placing a radially adjustable weight at the "true fulcrum" as at $e$, Fig. 2, I may vary the moment of inertia, commonly known as I, of the wheel at a given temperature without altering the amount of compensation for a given difference of temperature; this weight should, of course, be the same for each lever arm of a given wheel and it may also be used in effecting the balance of the wheel. Or, instead of varying I by adjusting these weights radially, I may, if I prefer, vary it by simply substituting for $e$ a weight of different magnitude. In such a case $e$ may be attached to the lever arm in any convenient manner.

In adjusting the balance wheel, also, I find it convenient to have an auxiliary weight W' (Fig. 2) whose mass is unequally distributed with reference to its center by reason of the hole $f$; a slot $g$ cut from the periphery to $f$ permits this weight to be held by its own resiliency. Turning W' upon its axis changes I very gradually and with but slight effect upon the compensation per unit angular change of the lever arm.

It may be required to alter the amount of compensation for a unit of change of temperature; in such case I may, as in the lower part of Fig. 1, arrange my low expansion spoke L' to terminate at its outer end in a shoe $h$ capable of being slid toward or away from the other spoke H', or, I may construct the wheel as in Fig. 2 where the low expansion spokes $L^2$, are an integral part of a structure $i$ arranged to pivot upon the center C' over a similar structure with which the remaining spokes $H^2$ are integral, a machine screw $j$ and slot $k$ serving to clamp the two structures together in any determined position. In this case the shoes $h'$ are simultaneously adjustable whereas in Fig. 1 the shoe $h$ is adjusted individually.

The structure $i$ and spokes $L^2$ instead of being integral as in Fig. 2, may comprise separate spokes suitably held in a distinct central structure so as to angularly shift in correspondence therewith.

To vary the compensation as above without alteration of I it is, of course, essential that the lever arms A be concentric, or approximately so, with the centers C or C'.

Referring to Fig. 2 a spur $l$ is fixed to the spoke $H^2$ and a similar spur $m$ to the weight W, the latter lying outside the former and overlapping it but the space between the spurs being quite small; this permits of handling the wheel without risk of pinching the lever arms inwardly beyond their elastic limits, spur $m$ striking spur $l$ long before such limit is reached.

Fig. 3 shows my invention as applied to a four-weight wheel. The essential features of construction are the same as those of the two-weight wheels shown in Fig. 1. By using four levers and weights instead of two I may, other things being equal, employ just half the weight upon each arm, or, with the same weight, I may lessen other factors as e. g., the angular separation of the spokes, or the length of the lever arm, so as to obtain from each arm just half the compensation per unit change of temperature, that is required from each arm in the two-weight wheel.

As all the material used in my improved wheel may be non-magnetic it is obvious that the balance wheel as a whole is non-magnetic.

I have described my improved wheel as having lever arms integral with the high compression spoke and endowed with an initial flex so that L is a compression member. This is an important feature of construction as it makes for simplicity, and hence cheapness of manufacture, and for freedom from lost motion. It is also highly favorable to the use of glass as a low expansion spoke since glass under compression has greatly higher strength than when in extension.

When the balance wheel is reciprocating five times per second the centrifugal force so produced violently throws the weights away from the axis of rotation. In order to counteract this force, the lever A resiliently presses the end of L to insure perfect contact between the bearings at each end member L; the lever itself may be made resilient or a spring may be employed for this purpose.

I have described my invention specifically glass for the low expansion member. This I find satisfactory, but I do not limit myself to this but may employ any other suitable material possessing the requisite properties explained above.

The employment of glass, silica, or analogous material is advantageous in compensating balance wheels on account of its low coefficient of expansion, but so far the low tensile strength of glass has prevented its use for that purpose. Glass and analogous material however possess great compression strength, and by my invention I have rendered glass readily available for the construction of compensating balance wheels, as I have so arranged the glass member that it is subjected only to a compression strain, the ends of such member being fitted against bearings with which they are kept in contact permanently and reliably by the inwardly exerted pressure of the weight-carrying arm. I find that, generally speaking of materials available for compensating balance wheels, materials having a lower coefficient of expansion than others, also have a higher melting point, and this is true particularly of glass and brass.

I have shown that the spoke end of the lever arm, measuring from the true fulcrum, moves outward for increase of temperature while the remaining part moves inward. In order that the lever arm proper may at least balance its own disturbing effect for change of temperature leaving the weight free to compensate for the other parts of the wheel, which I find to be desirable, it is obvious that with a given length of lever arm all other factors should be so chosen that the free end of the lever arm between the true fulcrum and the center of gravity of the weight should be at least one half the total length of the lever arm measuring, as before, from the center of gravity of the weight to the pivotal point C of the lever.

I find that in order to get the best results I require as material to be employed for the resistant member, one which will be "alive", that is one which once expanded by the action of heat will contract again under the influence of cold and which will not, as some materials do, when once expanded, remain partly in the enlarged position. I also find that the material should be of a resisting character, that is, it should not be subject to compression or modification of physical form at the point of contact $a$ with the arm or hub. These properties must also be combined with a certain degree of lightness essential to the proper construction of a compensating device for a watch, the weight of which is substantially limited to about one-half gram.

In the practical construction of my balance wheel constructed of brass and having a glass bar L, the approximate distance between $c$ and $b$ should be about 1/6 of the distance between $b$ and W, while the total weight of the weights W from the true fulcrum outwardly is about six times the weight of the remainder of the wheel. With this construction of the balance wheel I compensate not only for the variations of the temperature of the wheel itself, but include the compensation for the action of the hair spring under the various conditions of the temperature.

I claim:

1. A balance wheel for time pieces, comprising a lever, a member having a low expansion coefficient, forming a resistant pivotal support for said lever, and a member having a high expansion coefficient, connected to the lever, the said two members being so positioned relatively to each other that in all positions which the lever may assume under the influence of temperature variations, a certain point of said lever will remain at the same distance from the wheel's axis, and a weight carried by said lever at about the center of the semi-circular arc the diameter of which coincides with the radius drawn from the wheel's axis to the said constant point of the lever.

2. A balance wheel for time pieces, comprising a weight-carrying lever, a member having a low coefficient of expansion, forming a resistant pivotal support for the said lever, and a member having a high coefficient of expansion, connected to said lever on the side of said support opposite to the weight, the length of the lever from the point where said lever by reason of the differential expansion of said members remains motionless radially of the balance wheel, to the weight's center of gravity being at least equal to the distance between said point and the point of connection with the high coefficient member.

3. In a balance wheel, a member having a low coefficient of expansion forming a resistant pivotal support, a member having a high coefficient of expansion and a weight carrying lever connected with the member having a high coefficient of expansion, bearings to engage the ends of the low coefficient member which is removable from such bearings and means whereby said member is maintained at all temperature changes within said bearings by pressure.

4. A balance wheel comprising a hub and a leverage system composed of a circumferentially located lever arm weighted at one end, a support at one end of said lever having a relatively low melting point, a support for said lever intermediate of the first support and the weight, having a relatively high melting point, the two supports differing in their coefficient of expansion by not less than 2 to 1, and means for attaching said leverage system to said hub.

5. In a balance wheel, a weight carrying lever adapted to compensate for temperature induced variations in the size of the balance wheel, a member having a low coefficient of expansion forming a resistant pivotal support for the weight carrying lever; a member having a high coefficient of expansion movably connected to one end of the weight carrying lever and an adjustable weight placed on the weight carrying lever substantially at its true fulcrum.

6. In a balance wheel, a weight carrying lever, a member having a low coefficient of expansion forming a resistant pivotal support for the weight carrying lever, and a member having a high coefficient of expansion and movably connected to one end of the weight carrying lever, the two members being so positioned with relation to each other that the length of the lever from its true fulcrum to the free end thereof is at least equal to substantially one-half the entire length of the lever.

7. In an escapement regulator, two members of unequal coefficients of expansion, means for compensating for temperature induced variations in the size of the regulator, and means for varying the amount of compensation without varying the effective load of the regulator.

8. In a balance wheel, a weight carrying lever, means for moving said lever to compensate for temperature induced variations in the size of the balance wheel and an adjustable weight placed on the said weight carrying lever substantially at its true fulcrum.

9. A rimless balance wheel comprising: a plurality of weight carrying levers arranged peripherally of the wheel, a member having a low coefficient of expansion forming a plurality of resistant pivotal supports for the levers, and a member having a high coefficient of expansion movably connected to one end of the weight carrying levers.

10. In a balance wheel, a plurality of weight carrying levers, adapted to compensate for temperature induced variations in the size of the balance wheel, a member having a low coefficient of expansion forming a plurality of resistant pivotal supports for the weight carrying levers, a member having a high coefficient of expansion movably connected to one end of each of the weight carrying levers, and means for adjusting the leverage of the weight carrying levers in unison.

11. In a balance wheel, a member having a low coefficient of expansion forming a resistant pivotal support, a member having a high coefficient of expansion and a weight carrying lever connected to the member having a high coefficient of expansion and pressing inward so as to hold said lever in contact at all times with the member having the low coefficient of expansion.

12. In a balance wheel, a weight carrying lever adapted to compensate for temperature induced variations in the size of the balance wheel, a member having a low coefficient of expansion forming a resistant pivotal support for the weight carrying lever, a member having a high coefficient of expansion movably connected to the weight carrying lever, and means for varying the leverage of the weight carrying lever without bringing its weight nearer to or farther away from the center of oscillation.

13. In a balance wheel, means for compensating for temperature induced variations in the size of the balance wheel, and means for varying the effective load of the regulator without varying the amount of compensation.

14. In a balance wheel, a plurality of weight carrying levers, an active member having a high coefficient of expansion adapted to exert its expansive force on the weight carrying levers only, and a passive member having a low coefficient of expansion forming resistant pivotal supports for the weight carrying levers, said passive member being uninfluenced by the expansion and contraction of the active member.

15. In a balance wheel, a weight carrying lever, a non-magnetic member having a low coefficient of expansion forming a resistant pivotal support for the weight carrying lever, and a non-magnetic member having a high coefficient of expansion movably connected to the weight carrying lever.

16. In an escapement regulator, a weight carrying lever, a non-metallic, non-magnetic member having a low coefficient of expansion forming a resistant pivotal support for the weight carrying lever, and a metallic non-magnetic member having a high coefficient of expansion movably connected to the weight carrying lever.

17. A rimless balance wheel comprising: a plurality of weight carrying levers peripherally disposed, an active member having a high coefficient of expansion movably connected to the said weight carrying levers, at one end, a non-metallic passive member having a coefficient of expansion substantially one-half the coefficient of expansion of the active member forming resistant pivotal supports for the weight carrying levers.

18. In a compensating wheel for time pieces, the combination of weight-carrying lever movably connected to a member having a high coefficient of expansion, a bearing in said lever, a bearing upon said wheel facing the bearing upon said lever, a member having a low coefficient of expansion forming a resistant pivotal support for the weight-carrying lever, and located at one end between the free end of the lever and its connection with the member having a high coefficient of expansion, at its other end in the opposite bearing, and pressure exerting means bearing upon the lever to maintain the same in constant contact with the resistant support under all changes of temperature and of centrifugal speed.

19. In a balance wheel, the combination of an active member, a resilient weight carrying lever pivotally connected to the active member, and a passive member resting with one end on the active member and held thereagainst under compression by the resiliency of the weight carrying lever, for which latter it forms a pivotal support.

20. In an escapement regulator, the combination with two members having unequal coefficients of expansion, of a weight carrying lever having a resilient portion whereby it is maintained in contact with one of said members, and said lever moving only within the limit of elasticity of the said resilient portion to compensate for temperature induced variations in the size of the regulator.

21. In a balance wheel, the combination of an active member, a weight carrying lever pivotally connected to the active member, and a passive member loosely interposed between the active member and the weight carrying lever, for which latter it forms a pivotal support, and held under compression, exerted through the weight carrying lever against the active member.

22. In a balance wheel, the combination of two members having unequal coefficients of expansion, the expansion and contraction of each being uninfluenced by the expansion and contraction of the other, and means for utilizing the difference in expansion and contraction to compensate for temperature induced variations.

23. In an escapement regulator, a central hub and spokes of a material of relatively great expansibility under the influence of heat, weights movably connected to said spokes, and arms of unyielding material having less expansibility under the influence of heat interposed between the spokes and the hub, and forming pivotal supports around which the weights swing.

24. In an escapement regulator, a plurality of members of a material of relatively great expansibility under the influence of heat, a plurality of weights, a yielding elastic portion on each of said members connecting the weights thereto, a plurality of unyielding members of relatively less expansibility under the influence of heat around which the weights swing, and stops on the weights and on the first mentioned members, the stop of each weight coöperating with the stop on the next adjacent first mentioned member for preventing the weights from being moved inwardly beyond the limit of elasticity of the yielding elastic portion.

In testimony whereof, I have signed this specification in the presence of two subscribing witnesses.

FREDERIC ECAUBERT.

Witnesses:
  JOHN LOTKA,
  JOHN A. KEHLENBECK.